UNITED STATES PATENT OFFICE.

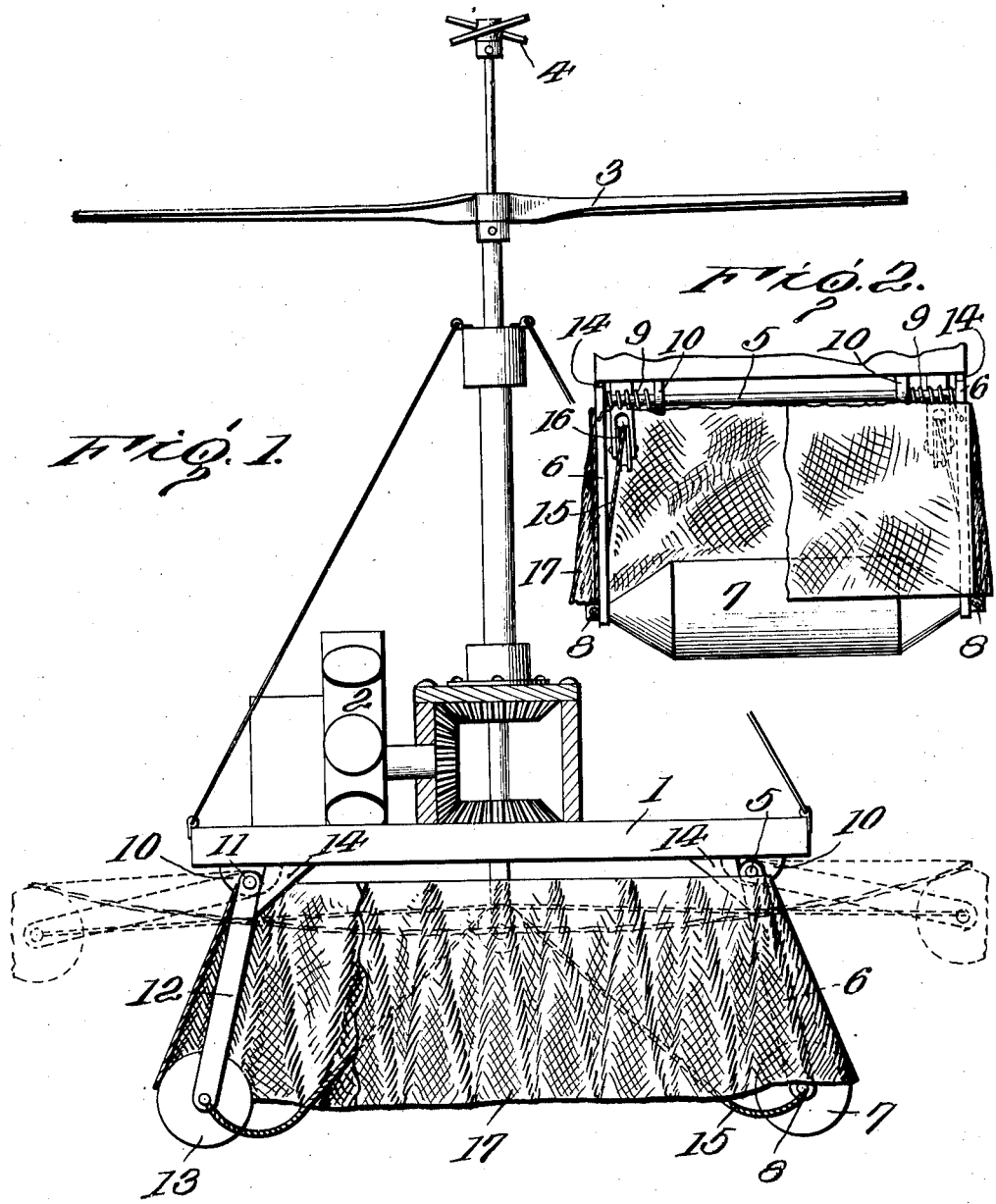

EMILE BERLINER, OF WASHINGTON, DISTRICT OF COLUMBIA, ASSIGNOR TO GYRO-COPTER LIMITED, OF WASHINGTON, DISTRICT OF COLUMBIA, A PARTNERSHIP COMPOSED OF EMILE BERLINER AND HENRY A. BERLINER.

HELICOPTER OR GYROCOPTER.

1,361,222.          Specification of Letters Patent.        Patented Dec. 7, 1920.

Application filed January 23, 1920. Serial No. 353,608.

*To all whom it may concern:*

Be it known that I, EMILE BERLINER, a citizen of the United States, residing at Washington, District of Columbia, have invented certain new and useful Improvements in Helicopters or Gyrocopters, of which the following is a description, reference being had to the accompanying drawing, and to the figures of reference marked thereon.

The invention relates to new and useful improvements in helicopters or gyrocopters, and more particularly to the means for supporting floats whereby the helicopter or gyrocopter may ride on the surface of the water.

Objects of the invention are to provide a supporting means for the floats for a helicopter or a gyrocopter, which supporting means is so constructed and arranged that the floats will be substantially beneath the supporting structure of the helicopter when in flight so as to offer little or no interference with the efficiency of the propellers, and wherein said floats are automatically brought into operation for supporting the helicopter on the surface of the water, and when positioned for supporting the helicopter said floats are well out from the supporting frame thereby increasing the stability of the support for the helicopter.

In the drawings which show by way of illustration one embodiment of the invention:—

Figure 1 is a view in side elevation with parts broken away, and showing more or less diagrammatically a helicopter with my improved supporting means for the floats applied thereto, and in dotted lines the position of the floats when supporting the helicopter upon the surface of the water, Fig. 2 is a detail showing in side elevation the supporting means for one of the floats.

The helicopter may be of any desired construction, and is provided with a supporting base carrying a power plant and lifting means which is operated thereby. Attached to the supporting base of the helicopter and preferably depending therefrom are two supports on each of which is mounted a float preferably in the form of an air cylinder. These supports are attached to the base so that they are capable of being turned outwardly away from the center of the helicopter and project horizontally from the base. The air cylinders are mounted at the ends of these supports and resilient means is provided for normally holding the supports in substantially vertical position beneath the supporting base so that said floats offer little or no interference with the efficiency of the propellers. Means is also provided which is operable in case the helicopter falls for automatically positioning said floats in favorable position for supporting the helicopter as above noted.

Referring more in detail to the drawings, I have shown a helicopter, consisting of a supporting base 1 upon which is mounted a motor indicated at 2, and this motor is adapted to operate vertical shafts each carrying a propeller indicated respectively at 3 and 4. These parts may be of any desired construction and will not be described further in detail. Beneath the base 1 I have provided a supporting shaft 5 to which is rigidly secured arms 6, 6. At the lower ends of the arms 6, 6 there is an air cylinder 7 having projecting ends 8, 8 pivotally supported by the arms 6, 6, respectively. As shown, two springs 9, 9 which are in the form of coiled springs wound about the shaft 5 are provided, one end of each spring being attached to the arm 6 with which it is associated and the other end of each spring being attached to the supporting base 1. These springs are so disposed as to normally swing the arms 6, 6 into the position shown in full lines in Fig. 1 and stops 10 engaging the arms 6 limit their movement so that said arms will be held slightly inclined to the vertical with the lower ends thereof slightly to the right of the vertical line from the point 5 as viewed in Fig. 1. On the other side of the machine there is a shaft 11 to which arms 12, 12 are fixed, and these arms carry an air cylinder 13. Associated with the arms 12, 12 are springs 9, 9 and the parts are in every way duplicates of those on the other side of the machine. The arms 12, 12 are limited in their movement by stops 14, 14. Connected to the cylinders or the arms 6 and 12 at the outer ends thereof are ropes or chains 15 which run over pulleys 16 adapted to take up the slack in the ropes.

The arms 6 and 12 are inclined outwardly slightly toward their lower ends, and if the helicopter lights on the surface of the water with the arms still in normal position, the cylinders 7 and 13 will be moved away from each other and finally assume the position shown in dotted lines in Fig. 1. Means is provided, however, for automatically swinging the arms or frames carrying the air cylinders outwardly in case the helicopter falls. This means consists of a canvas or fabric curtain indicated at 17 in the drawings. Said curtain extends across the frames carrying the cylinders and hangs in gathers between these frames so as to permit the frames to swing outwardly to the dotted line position shown in Fig. 1. The canvas curtain is attached to the frames in any suitable way, and in case the helicopter falls, air will be pocketed within this curtain and will cause it to open after the manner of a parachute, and the opening of the curtain will swing the frames carrying the floats so as to place the same in a favorable position for supporting the helicopter on the surface of the water. If, however, the helicopter light upon the water without the curtain having opened out as stated above, the cylinders are so disposed as to move outwardly away from each other against the tension of the springs holding them in the normal position shown in full lines in Fig. 1, and thus the cylinders will be brought to a proper or favorable position for supporting the helicopter so that it will ride freely upon the surface of the water and in upright position.

It will be understood, of course, that the details shown in the drawings and referred to in the description are purely for the purpose of illustrating the principle of the invention, and these illustrated and described details do not impose any restrictions whatever upon the invention set forth in the claims.

Having thus described the invention, what I claim as new and desire to secure by Letters-Patent, is:—

1. The combination of a helicopter, floats for supporting said helicopter upon the surface of the water, and means for adjustably connecting said floats to the helicopter in such a manner so that during flight, said floats are substantially within the limits of the supporting base of the helicopter, so as to offer little or no interference with the efficiency of the propellers, and yet, when said helicopter lights upon the surface of the water the floats are adapted to be moved to some distance from the helicopter base and thereby give greater stability to the helicopter as it floats upon the surface of the water.

2. The combination of a helicopter, floats for supporting a helicopter upon the surface of the water, and means for adjustably connecting the floats to the helicopter whereby during flight said floats are substantially beneath the supporting base of the helicopter but adapted to be moved to substantially the same horizontal plane as the supporting base and at a distance therefrom when said helicopter rides upon the surface of the water.

3. The combination of a helicopter having a supporting base, arms pivoted thereto and normally depending from the base and inclining outwardly toward their lower ends, floats carried by said arms, resilient means for pressing said arms toward their normal position, stops for limiting the movement of the arms for holding them in a predetermined normal position, and means for limiting the outward movement of the arms whereby they are held substantially horizontal when supporting the helicopter upon the surface of the water.

4. In a helicopter or gyrocopter, a supporting base, frames attached to said base and carrying floats, said floats being normally supported substantially within the limits of the base and capable of swinging upwardly and outwardly and means operating through air pressure if the helicopter falls for automatically bringing said floats into a predetermined favorable position for supporting the helicopter.

5. In a helicopter or gyrocopter, swinging frames, a float carried by each frame, springs attached to said frames and normally holding said frames in substantially vertical position with the floats within the limits of the base so as to offer little or no interference with the efficiency of the propellers of the helicopter, a flexible curtain attached to the said base and depending therefrom, said curtain being connected to said frames whereby in case said helicopter falls air pressure on said curtain will swing the frames into substantially horizontal position with the floats well beyond the limits of the supporting base.

In testimony whereof, I affix my signature.

EMILE BERLINER.